US011378676B2

(12) United States Patent
Frenkel et al.

(10) Patent No.: US 11,378,676 B2
(45) Date of Patent: Jul. 5, 2022

(54) METHODS AND SYSTEMS FOR DETECTING AND/OR TRACKING A PROJECTILE

(71) Applicant: ELTA SYSTEMS LTD., Ashdod (IL)

(72) Inventors: Noam Frenkel, Karmey Yosef (IL); Josef Steinmetz, Givat Shmuel (IL)

(73) Assignee: ELTA SYSTEMS LTD., Ashdod (IL)

( * ) Notice: Subject to any disclaimer, the term of this patent is extended or adjusted under 35 U.S.C. 154(b) by 239 days.

(21) Appl. No.: 16/346,904

(22) PCT Filed: Nov. 14, 2017

(86) PCT No.: PCT/IL2017/051236
§ 371 (c)(1),
(2) Date: May 2, 2019

(87) PCT Pub. No.: WO2018/087770
PCT Pub. Date: May 17, 2018

(65) Prior Publication Data
US 2020/0057154 A1    Feb. 20, 2020

(30) Foreign Application Priority Data

Nov. 14, 2016  (IL) .......................................... 248966

(51) Int. Cl.
*G01S 13/74*     (2006.01)
*F41G 7/00*      (2006.01)
(52) U.S. Cl.
CPC .............. *G01S 13/74* (2013.01); *F41G 7/001* (2013.01)
(58) Field of Classification Search
CPC ................................. G01S 13/74; F41G 7/001
See application file for complete search history.

(56) References Cited

U.S. PATENT DOCUMENTS 3,179,355 A    4/1965  Pickering et al.
3,290,677 A *  12/1966 Jacob ...................... G01S 13/36
                                                                342/146
(Continued)

FOREIGN PATENT DOCUMENTS

EP    0 355 336 A1    2/1990
EP    0 624 805 A1    11/1994
(Continued)

OTHER PUBLICATIONS

D. Smith et al. "Circularly Polarised Antenna Designs for a Semi Active Radar Target", 24th European Microwave Conference, Sep. 5, 1994, pp. 401-406, XP031604984.

*Primary Examiner* — Marcus E Windrich
(74) *Attorney, Agent, or Firm* — Oliff PLC

(57) ABSTRACT

A device for detecting and/or tracking a projectile has a receiving antenna, for receiving at least an electromagnetic signal emitted by at least one radar, at least one amplifier configured to amplify the electromagnetic signal received by the receiving antenna, and at least one emitting antenna. The emitting antenna is configured to return, at an output of the device, an amplified electromagnetic signal for calculating data indicative of the trajectory of the projectile based at least on the amplified electromagnetic signal. A system for detecting a projectile has a transmitting device mounted on the projectile, a radar configured to sense an electromagnetic signal produced and sent by the transmitting device. The signals emitted from the projectile are limited to the electromagnetic signal sent by the transmitting device, and a processing unit, configured to calculate data indicative of the trajectory of the projectile, based on the sensing of the electromagnetic signal.

21 Claims, 8 Drawing Sheets

(56) References Cited

U.S. PATENT DOCUMENTS

| | | | |
|---|---|---|---|
| 4,097,007 A | 6/1978 | Fagan et al. | |
| 4,281,809 A | 8/1981 | Oglesby et al. | |
| 4,547,949 A | 10/1985 | Heller et al. | |
| 5,014,062 A | 5/1991 | Schriner et al. | |
| 5,131,602 A | 7/1992 | Linick | |
| 5,280,751 A | 1/1994 | Muirhead et al. | |
| 5,355,767 A | 10/1994 | Morita | |
| 5,597,136 A * | 1/1997 | Wilke | G01S 13/9092 244/3.15 |
| 5,685,504 A * | 11/1997 | Schneider | F41G 7/305 244/3.11 |
| 5,847,675 A | 12/1998 | Poinsard | |
| 6,259,400 B1 | 7/2001 | Higgins et al. | |
| 6,307,514 B1 * | 10/2001 | West | F42B 30/006 343/705 |
| 6,450,442 B1 * | 9/2002 | Schneider | F41G 7/305 244/3.14 |
| 6,727,843 B1 * | 4/2004 | Hansen | F41G 7/305 342/61 |
| 7,082,878 B2 | 8/2006 | Facciano et al. | |
| 7,999,212 B1 * | 8/2011 | Thiesen | F42B 10/64 342/149 |
| 9,316,469 B2 | 4/2016 | Parker et al. | |
| 9,335,127 B1 * | 5/2016 | Boka | F41H 11/02 |
| 2005/0184192 A1 | 8/2005 | Schneider | |
| 2005/0253017 A1 * | 11/2005 | Kongelbeck | F41G 7/2286 244/3.1 |
| 2006/0244612 A1 * | 11/2006 | Pridmore | F42B 12/382 340/573.2 |
| 2006/0290561 A1 * | 12/2006 | Praskovsky | G01S 13/87 342/195 |
| 2011/0059421 A1 | 3/2011 | Hickman | |
| 2012/0240808 A1 * | 9/2012 | Larousse | F42C 15/44 102/481 |
| 2013/0169477 A1 * | 7/2013 | Luo | G01S 19/54 342/357.36 |
| 2014/0327568 A1 * | 11/2014 | Van Ommeren | G01S 13/424 342/146 |
| 2015/0007741 A1 | 1/2015 | Nath et al. | |
| 2016/0003579 A1 * | 1/2016 | Stansfield | G01S 13/878 244/3.19 |

FOREIGN PATENT DOCUMENTS

| | | |
|---|---|---|
| FR | 2 202 276 A1 | 5/1974 |
| FR | 2 444 253 A3 | 7/1980 |
| FR | 2 490 802 A1 | 3/1982 |
| FR | 2 759 775 A1 | 8/1998 |
| GB | 1179471 A | 1/1970 |
| GB | 1 605 236 A | 6/1985 |
| GB | 2 219 175 A | 11/1989 |

* cited by examiner

METHODS AND SYSTEMS FOR DETECTING AND/OR TRACKING A PROJECTILE

TECHNICAL FIELD

The presently disclosed subject matter relates to detecting and/or tracking of a projectile, in particular for determining the impact point of the projectile.

BACKGROUND

When a projectile is launched, it can be required to determine its impact point. The impact point can be defined as the area and/or the point that will be reached by the projectile at the end of its trajectory.

In particular, on a battlefield, it is often required to determine the impact point of military projectiles, such as shells, missiles, etc. This can be required either by the attacking party (e.g. in order to determine to what extent their attacks reached their targets), and/or by the defending party (e.g. in order to prevent damages or perform defense maneuvers).

In the prior art, it has been proposed to rely on the presence of an operator on the ground, who carries an optical instrument for determining the impact point of the projectile. The operator then reports, by means of an adapted communication device, to a central station.

It has also been proposed to use a GPS sensor mounted on the projectile, which measures the position of the projectile. The measured data are then sent to a central processing unit for detecting and/or tracking the projectile and determining the impact point of the projectile.

Accordingly, there is a need to propose improved methods and systems for detecting and/or tracking a projectile, in particular for determining the impact point of the projectile.

General Description

In accordance with certain aspects of the presently disclosed subject matter, there is provided a device for detecting and/or tracking a projectile, the device comprising at least one receiving antenna, for receiving at least an electromagnetic signal emitted by at least one radar in the radio-frequency range, at least one amplifier configured to amplify the electromagnetic signal received by the receiving antenna, and at least one emitting antenna, wherein said emitting antenna is configured to return, at an output of the device, an amplified electromagnetic signal for calculating data indicative of the trajectory of the projectile based at least on said amplified electromagnetic signal, said device being configured to maintain said electromagnetic signal in the radio-frequency range from its reception by the receiving antenna to its return as an amplified electromagnetic signal by said emitting antenna at the output of the device.

According to some embodiments, a function representing the amplified electromagnetic signal with respect to time at the output of the device differs from a function representing the electromagnetic signal received by the device with respect to time only by a difference in the amplitude. According to some embodiments, the receiving antenna is configured to output an electromagnetic signal with a first polarization, and the emitting antenna is configured to output an electromagnetic signal with a second polarization, wherein the first polarization is different from the second polarization. According to some embodiments, the device is further configured to modulate the electromagnetic signal before or after its amplification by the amplifier.

These embodiments can be combined according to any of their possible technical combination.

In accordance with some aspects of the presently disclosed subject matter, there is provided a projectile comprising said device.

In accordance with some aspects of the presently disclosed subject matter, there is provided a system for detecting and/or tracking a projectile, comprising at least one radar configured to send an electromagnetic signal to a device mounted on the projectile, wherein the device is configured to sense and amplify said electromagnetic signal in order to return an amplified electromagnetic signal at an output of the device, and maintain said electromagnetic signal in the radio-frequency range from its sensing by the device to its return as an amplified electromagnetic signal at the output of the device, and at least one processing unit, configured to calculate data indicative of the trajectory of the projectile, based at least on the sensing of said amplified electromagnetic signal.

According to some embodiments, a function representing the amplified electromagnetic signal with respect to time at the output of the device differs from a function representing the electromagnetic signal sensed by the device with respect to time only by a difference in the amplitude. According to some embodiments, the system further comprises one or more passive and/or active radars and/or antennas for sensing the amplified electromagnetic signal. According to some embodiments, the system is further configured to determine an impact point of the projectile based on the calculated data. According to some embodiments, the system is configured to send a command to the projectile based on the determined impact point. According to some embodiments, the radar is configured to send the command. According to some embodiments, the device comprises at least a receiving antenna which outputs an electromagnetic signal with a first polarization, and at least an emitting antenna which outputs an electromagnetic signal with a second polarization, wherein the first polarization is different from the second polarization. According to some embodiments, the system is configured to detect and/or track a plurality of projectiles and to differentiate between the projectiles of the plurality of projectiles. According to some embodiments, the data indicative of the trajectory of the projectile are calculated based at least on the sensing of the amplified electromagnetic signal, without using information of additional position sensors. According to some embodiments, the radar is configured to send electromagnetic signals which have at least one the following parameters: a pulse repetition frequency between 0.5 kHz and 100 kHz, and a duty cycle which is between 1% and 50% of a pulse repetition interval, wherein the processing unit is configured to perform a differentiation between amplified electromagnetic signals returned by the device towards the radar, and amplified electromagnetic signals returned by the device and sensed by the radar after their reflection on one or more obstacles, for calculating data indicative of the trajectory of the projectile.

These embodiments can be combined according to any of their possible technical combination.

In accordance with some aspects of the presently disclosed subject matter, there is provided a system for detecting and/or tracking a projectile, comprising at least one transmitting device mounted on the projectile, at least one radar configured to sense at least an electromagnetic signal produced and sent by said transmitting device mounted on the projectile, wherein signals emitted from the projectile are limited to the electromagnetic signal sent by the transmitting device, and at least one processing unit, configured to calculate data indicative of the trajectory of the projectile, based on the sensing of the electromagnetic signal.

According to some embodiments, the processing unit is configured to determine an impact point of the projectile based on the calculated data, while the projectile is flying in the air. According to some embodiments, the system comprises one or more passive radars. According to some embodiments, the data indicative of the trajectory of the projectile are calculated based on the electromagnetic signal sent by the transmitting device and sensed by the radar, without using information of additional position sensors. According to some embodiments, the transmitting device is configured to send electromagnetic signals which have at least one the following parameters: a pulse repetition frequency between 0.5 kHz and 100 kHz, and a duty cycle which is between 1% and 50% of a pulse repetition interval, wherein the processing unit is configured to perform a differentiation between electromagnetic signals sent by the transmitting device towards the radar, and electromagnetic signals sent by the transmitting device and sensed by the radar after their reflection on one or more obstacles, for calculating data indicative of the trajectory of the projectile.

These embodiments can be combined according to any of their possible technical combination.

In accordance with some aspects of the presently disclosed subject matter, there is provided a method of detecting and/or tracking a projectile, comprising sending, with at least one radar, at least an electromagnetic signal, wherein a device mounted on the projectile senses the electromagnetic signal, amplifies said electromagnetic signal and returns an amplified electromagnetic signal at an output of the device, wherein the device maintains said electromagnetic signal in the radio-frequency range from its sensing by the device to its return as an amplified electromagnetic signal at the output of the device, and calculating data indicative of the trajectory of the projectile, based at least on the sensing of the amplified electromagnetic signal.

According to some embodiments, the method comprises determining an impact point of the projectile based on the calculated data. According to some embodiments, a function representing the amplified electromagnetic signal with respect to time at the output of the device differs from a function representing the electromagnetic signal sensed by the device with respect to time only by a difference in the amplitude. According to some embodiments, the method comprises sending a command to the projectile based on the determined impact point. According to some embodiments, the method comprises sending, with said at least one radar, electromagnetic signals which have at least one the following parameters: a pulse repetition frequency between 0.5 kHz and 100 kHz, and a duty cycle which is between 1% and 50% of a pulse repetition interval, wherein the method comprises performing a differentiation between amplified electromagnetic signals returned by the device towards the radar, and amplified electromagnetic signals returned by the device and sensed by the radar after their reflection on one or more obstacles, for calculating data indicative of the trajectory of the projectile.

These embodiments can be combined according to any of their possible technical combination.

In accordance with some aspects of the presently disclosed subject matter, there is provided a method of detecting and/or tracking a projectile, comprising producing and sending at least an electromagnetic signal with at least a transmitting device mounted on the projectile, wherein signals emitted from the projectile are limited to the electromagnetic signal sent by the transmitting device, and calculating data indicative of the trajectory of the projectile based on the sensing of said electromagnetic signal.

According to some embodiments, the method comprises determining an impact point of the projectile based on the calculated data while the projectile is flying in the air. According to some embodiments, the data indicative of the trajectory of the projectile are calculated based on the sensing of the electromagnetic signal, without using information of additional position sensors. According to some embodiments, the method comprises sending, with said transmitting device, electromagnetic signals which have at least one the following parameters: a pulse repetition frequency between 0.5 kHz and 100 kHz and a duty cycle which is between 1% and 50% of a pulse repetition interval, wherein the method comprises performing a differentiation between electromagnetic signals sent by the transmitting device towards the radar, and electromagnetic signals sent by the transmitting device and sensed by the radar after their reflection on one or more obstacles, for calculating data indicative of the trajectory of the projectile.

These embodiments can be combined according to any of their possible technical combination.

According to some embodiments, the proposed solution can provide tracking and assessment of the impact point of the projectile in a swift and efficient manner.

According to some embodiments, the proposed solution can provide detecting and/or tracking of the projectile and assessment of the impact point of a plurality of projectiles.

According to some embodiments, the proposed solution can predict the impact point of the projectile in advance, while the projectile is flying in the air.

According to some embodiments, the proposed solution relies on the use of low cost components.

According to some embodiments, the proposed solution is autonomous and does not require the intervention of a human.

According to some embodiments, the proposed solution can provide a precise estimation of the impact point of the projectile.

According to some embodiments, the proposed solution can provide an estimation of the impact point, even for long range projectiles.

According to some embodiments, the proposed solution can provide a visual display of the impact point.

According to some embodiments, the proposed solution can detect and/or track rotating projectiles, such as spin-stabilized projectiles.

According to some embodiments, the proposed solution can provide a satisfactory level of the power of a signal emitted by a device mounted on the projectile towards a radar, for detecting and/or tracking the projectile.

According to some embodiments, the proposed solution may include a device mounted on the projectile which receives and sends back an electromagnetic signal, wherein the device does not manipulate the signal as received (such as by changing its frequency and/or delaying it), except for its amplification.

According to some embodiments, the proposed solution can prevent the electromagnetic signal which is sent back by a device mounted on the projectile from interfering with a receiving part of the device, by isolating an emitting part of the device from the receiving part of the device.

According to some embodiments, the proposed solution may be used for detecting and/or tracking military projectiles which carry an explosive device.

According to some embodiments, the impact point of the projectile can be predicted with satisfactory precision.

According to some embodiments, the proposed solution allows an increase of the range for which the projectiles can be detected and/or tracked, with respect to some prior art solutions. In particular, amplification of the received signal by an amplifier of a device mounted on the projectile allows increasing the detecting and/or tracking range.

According to some embodiments, the proposed solution offers a large coverage area for detecting and/or tracking the projectile, which is larger than the coverage area of prior art solutions relying on human operators or UAVs. In addition, the precision of the calculation of the impact point is improved.

According to some embodiments, the proposed solution provides detection and/or tracking of a projectile while handling multipath reduction in a more efficient way.

According to some embodiments, the proposed solution provides detection and/or tracking of a projectile while handling multipath reduction in a less time-consuming manner.

According to some embodiments, the proposed solution provides detection and/or tracking of a projectile while handling multipath reduction with electromagnetic signals having a higher bandwidth.

According to some embodiments, the proposed solution provides detection and/or tracking of a projectile while handling multipath reduction even with radars scanning space with low or medium power.

According to some embodiments, the proposed solution provides detection and/or tracking of the projectile at lower elevation angles and/or at lower heights from the ground. According to some embodiments, the precision of the determination of the impact point is thus improved.

According to some embodiments, the proposed solution provides detection and/or tracking of the projectile with a better accuracy in the azimuth direction.

According to some embodiments, the proposed solution provides detection and/or tracking of the projectile with a better accuracy in the elevation direction.

According to some embodiments, the proposed solution provides an increase of the number of pulses sent by the radar, by shortening the duty cycle and/or raising the pulse repetition frequency, without harming the energy of the signals (thereby allowing handling the multi-path phenomena). As a consequence, according to some embodiments, a greater bandwidth is obtained. According to some embodiments, the greater bandwidth is obtained without increasing the duration of the signals, or even with a reduction of this duration.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter can be practiced without these specific details. In other instances, well-known methods have not been described in detail so as not to obscure the presently disclosed subject matter.

Unless specifically stated otherwise, as apparent from the following discussions, it is appreciated that throughout the specification, discussions utilizing terms such as "calculating", "determining", "predicting", "displaying", or the like, refer to the action(s) and/or process(es) of a processing unit that manipulate and/or transform data into other data, said data represented as physical data, such as electronic, quantities and/or said data representing the physical objects.

The term "processing unit" covers any computing unit or electronic unit that can perform tasks based on instructions stored in a memory, such as a computer, a server, a chip, etc. It encompasses a single processor or multiple processors, which can be located in the same geographical zone or can, at least partially, be located in different zones and which are able to communicate with each other.

Embodiments of the presently disclosed subject matter are not described with reference to any particular programming language. It will be appreciated that a variety of programming languages can be used to implement the teachings of the presently disclosed subject matter as described herein.

In the present description, the expression "a projectile" includes a projectile that can be launched in the air for reaching an impact point (also called impact area, or target). The impact point can be e.g. located on the ground.

According to some examples, it can include e.g. a shell, a missile, a bomb, an artillery projectile, etc.

According to some examples, it can include projectiles which are launched by a ground launcher and/or an air launcher (such as an airplane) and/or a sea launcher.

According to some examples, it can include projectiles which do not comprise independent propulsion means.

According to some examples, it can include for example projectiles which are sent for military purposes or projectiles which are sent for civilian purposes (such as e.g. a projectile carrying medical supplies, or consumable products (foodstuffs), which have to be sent to a predefined target).

According to some examples, it can include a rotating projectile, such as a spin-stabilized projectile.

The aforementioned examples of projectiles are however not limitative.

Figure 1:
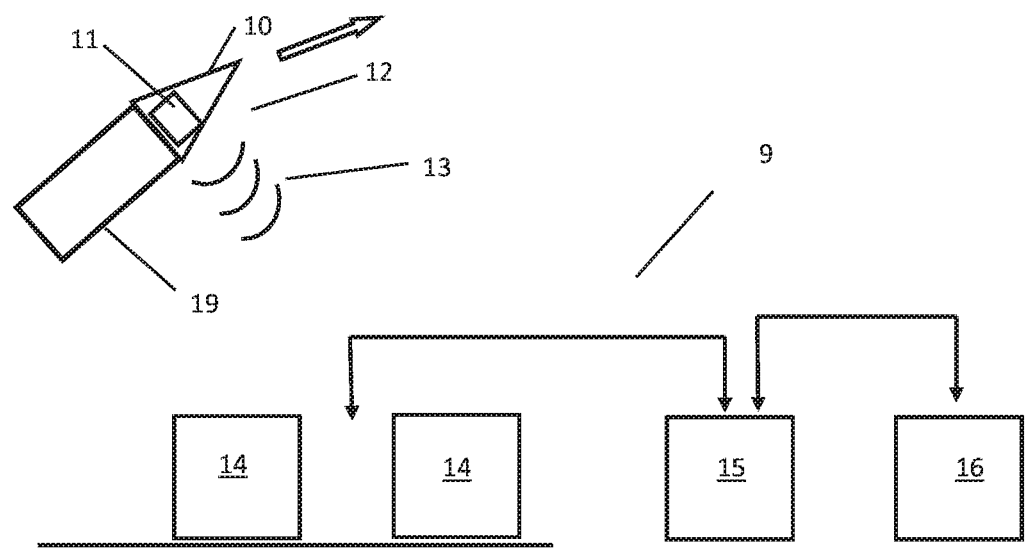
FIG. 1 illustrates an embodiment of a system for detecting and/or tracking of a projectile, which can also be used to determine an impact point of the projectile.

FIG. 1 is a schematic representation of an embodiment of a system 9 for detecting and/or tracking a projectile 12. According to some embodiments, the system 9 can predict an impact point of the projectile 12, for example while the projectile 12 is flying in the air.

The system can comprise at least one radar 14.

According to some embodiments, the system 9 can predict an impact point of the projectile 12 with a single radar 14.

According to some embodiments, the system can comprise a plurality of radars 14. The use of a plurality of radars 14 can improve the accuracy of the detecting and/or of the tracking of the projectile and prediction of the impact point of the projectile 12.

The radar 14 can receive an electromagnetic signal 13 sent by at least a transmitting device 11 mounted on the projectile 12. As explained later in the specification, according to some embodiments, the transmitting device 11 can produce this electromagnetic signal by itself, and send it using for example an antenna.

The expression "mounted on" is not intended to limit the position of the transmitting device 11 and various positions of the transmitting device can be used with respect to the projectile 12 (e.g. parts of the transmitting device can be located inside and/or outside the projectile, and can be located at various levels of the projectile).

Although reference will be made in the specification to "an electromagnetic signal", it is to be understood that this expression can cover a plurality of electromagnetic signals, sent concurrently and/or sequentially over time.

According to some embodiments, at least part of the radars 14 (or all of them) are passive radars, which means that they are configured to sense electromagnetic waves that they receive, yet they do not emit electromagnetic waves. It is to be noted that the radar 14 can also be replaced by an antenna or a passive antenna.

According to some embodiments, at least part of the radars 14 (or all of them) are active radars.

According to some embodiments, the launching area and/or the impact point of the projectile are located in the field of view of at least part of the radars 14 (or of all of them).

Figure 1A:
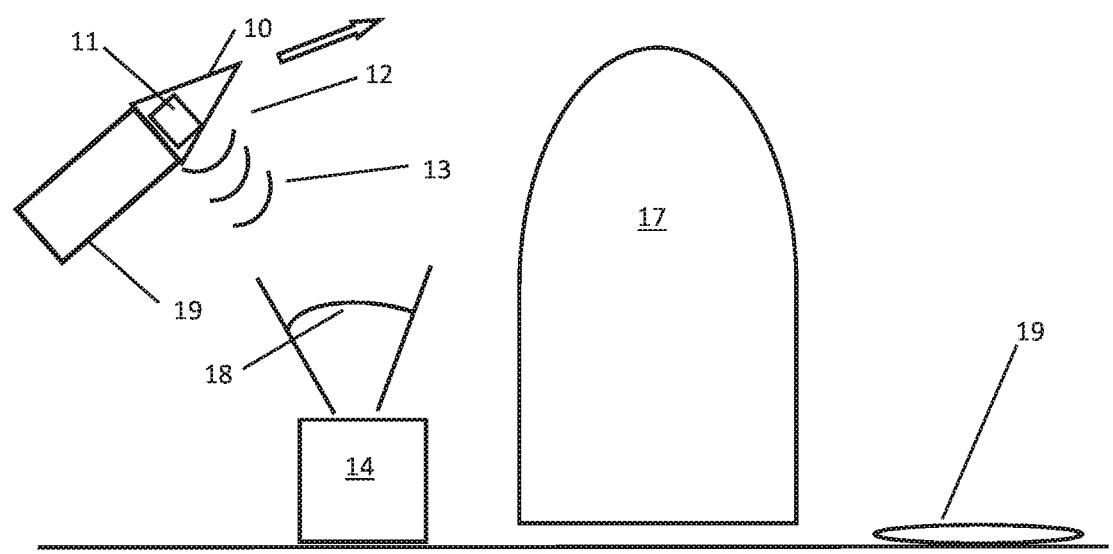
FIG. 1A illustrates an embodiment of a system for detecting and/or tracking of a projectile, wherein the projectile is flying over a ground surface comprising elevated parts.

According to some embodiments (see e.g. FIG. 1A), at least part of the radars 14, or all of the radars 14 are located so that their field of view 18 does not intersect the impact point 19 of the projectile 12. This can arise when the ground surface on which the projectile is flying comprises elevated parts 17, such as mountains or buildings, which prevent the radar 14 from "seeing" the impact point 19. In such cases, the system 9 can, nevertheless, be configured to predict the impact point 19 of the projectile 12.

According to some embodiments, synchronization methods can be used, in order to synchronize the signals sent by the transmitting device 11 and the radars 14. For example, the transmitting device 11 can send a synchronization signal which is coded according to a particular mathematical formula (such as a Fibonacci suite—this example being not limitative). The radar 14 can store the corresponding mathematical formula in a memory and can thus decode the synchronization signal. An appropriate decoder can be integrated in the radar 14 for performing such decoding.

The radar 14 can also receive data from the launcher (not represented) of the projectile 12, which communicates e.g. the initial time at which the projectile 12 was fired from the launcher.

The system 9 can further comprise a processing unit 15. The processing unit 15 can be configured to communicate with the radar 14, in order e.g. to determine an impact point of the projectile 12 based on the data measured by the radar 14. According to some embodiments, the processing unit 15 further receives data calculated by the radar 14.

The system 9 can further comprise a display unit 16.

According to some embodiments, the display unit 16 can be a dedicated display unit, such as a dedicated screen.

According to some embodiments, the display unit 16 can be a display unit of an existing device, such as a screen of a computer, a smartphone, a tablet, etc. This list is not limitative.

According to some embodiments, the display unit 16 displays the predicted impact point of the projectile which was calculated by the processing unit. For example, the display unit can display a map of the ground surface on which the projectile is flying, and can pinpoint an area on the map which represents the estimated impact point. Depending on the embodiments, the display unit 16 can display an estimation of the damages that will be caused by the projectile when it reaches its final destination.

The system 9 can further comprise a user interface (not represented), which can allow a user to communicate with the processing unit. The user can thus enter data on the projectile, or on the ground surface, or other data. The user can for example interact with the user interface by using the display unit 16.

Figure 2:
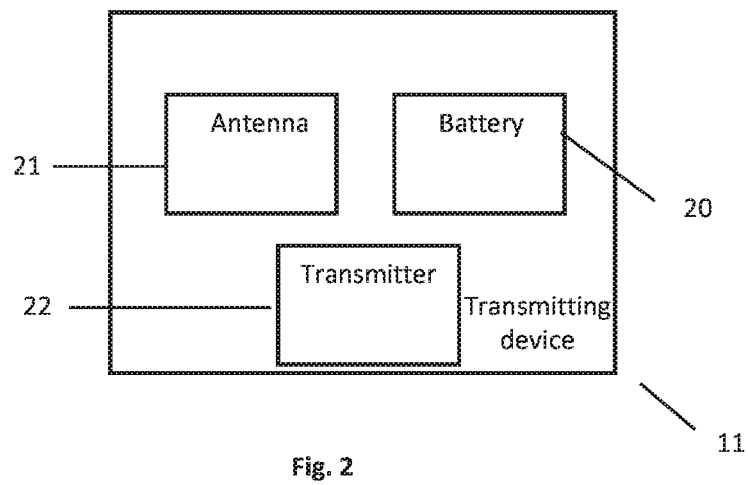
FIG. 2 illustrates an embodiment of a transmitting device which can be mounted on the projectile.

Attention is now drawn to FIG. 2, which describes a possible embodiment of the transmitting device 11.

As shown, the transmitting device 11 can comprise a transmitter 22, a source of energy 20 (such as a battery), and an antenna 21.

The transmitter 22 can generate a radio frequency current applied to the antenna 21, which in turn radiates electromagnetic waves in the radio-frequency range. Electromagnetic waves sent by the transmitting device 11 can include e.g. continuous and/or pulsed waves.

The source of energy 20 and the transmitter 22 can be integrated on a PCB (printed circuit board). According to some embodiments, the source of energy 20 is external to the transmitting device 11.

According to some embodiments, the transmitting device 11 only transmits electromagnetic waves and is not configured to sense data, and/or is not configured to receive data.

According to some embodiments, the transmitting device 11 is mounted in a head 10 of the projectile 12. The transmitting device 11 can also be located in a body 19 of the projectile 12.

According to some embodiments, the only signals that are emitted from the projectile are electromagnetic waves sent by the transmitting device (or the plurality of transmitting devices mounted on the projectile). In particular, it is thus not needed to rely on signals sent from a constellation of GNSS satellites, or to send a calculated position of the projectile from the projectile to a central processing unit. The electromagnetic waves sent by the transmitting device towards the radar can be sufficient to detect and/or track the projectile and to estimate the impact point of the projectile.

It is thus not needed to use information provided by additional sensors such as GPS sensors, position sensors, laser range sensor, etc.

It is to be noted that the projectile 12 can be a projectile which rotates along its main axis. It can be for example a spin-stabilized projectile. According to some embodiments, the projectile 12 has a high speed of rotation (such as, but not limited to, a rotation equal to or higher than 200 rotations per second).

Figure 2A:
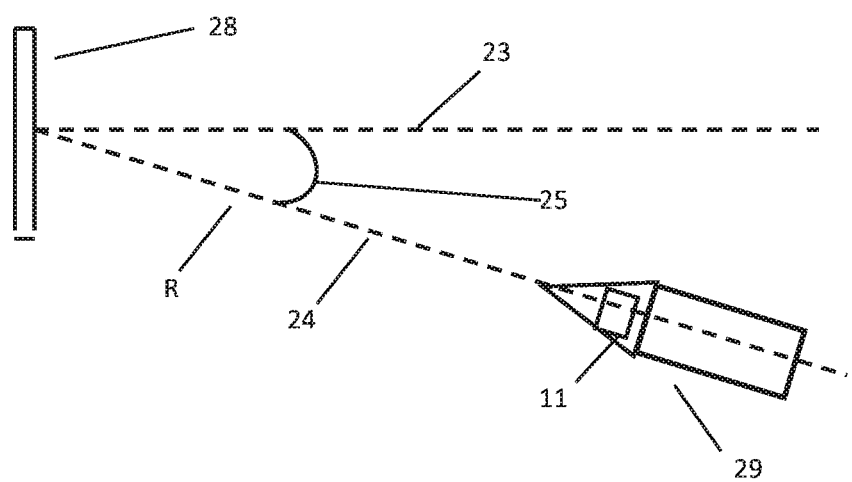
FIG. 2A illustrates an embodiment of a computation of data indicative of the trajectory of the projectile.

FIG. 2A illustrates a configuration in which a single radar 28 (similar to radar 14) is used in the system for detecting and/or tracking a projectile. A projectile 29 comprising a transmitting device 11 is also illustrated.

The use of a radar 28 allows to calculate data indicative of the trajectory of the projectile 29. This calculation can be performed by the radar 28 itself (that is to say by a processing unit which is part of the radar) or by an external processing unit in communication with the radar (such as the processing unit 15).

According to some embodiments, the radar 28 is configured to calculate at least the following data based on the measured electromagnetic signal received from the transmitting device of the projectile:
- a distance of the projectile with respect to the radar (also called range "R"), and
- azimuth and/or elevation angles. In FIG. 2A, the azimuth angle 25 is illustrated as the angle between an axis of the radar (such as axis 23 in FIG. 2A, which is for example an axis perpendicular to the main direction of the radar) and an axis of the projectile (such as a main axis 24 of the projectile).

The calculation of the range and angle of the projectile can be performed by using known per se algorithms, such as a multilateration algorithm, a multi-angulation algorithm or a fusion algorithm, or a time difference of arrival (TDOA) algorithm, a frequency difference of arrival (FDOA) algorithm, a differential Doppler (DDOP) algorithm, etc. This list is however not limitative.

In addition, according to some embodiments, various data indicative of the trajectory of the projectile can be calculated, such as range, azimuth angle and elevation angle of the projectile.

If a plurality of radars is used, the calculation of the position and relative angle(s) of the projectile can be more precise. Indeed, a radar generally comprises a direction of measurement for which the precision is better than its other direction of measurement. By using two radars which are disposed in orthogonal directions, the combined resolution is enhanced.

Figure 3:
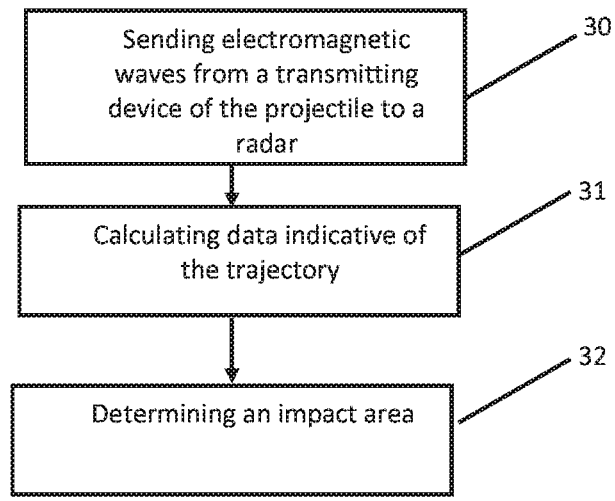
FIG. 3 illustrates an embodiment of a method of determining an impact point of a projectile, using a transmitting device mounted on the projectile.

FIG. 3 describes an embodiment of a method of detecting and/or tracking a projectile and determining an impact point of a projectile, which can use the system as previously described.

The method can comprise a step 30 of sending electromagnetic waves from at least a transmitting device mounted on the projectile.

The electromagnetic waves are generally sent by the transmitting device of the projectile while the projectile is flying in the air, in order to reach its target.

If a plurality of radars is used, part of the radars, or all the radars, can receive the emitted electromagnetic waves.

The method can comprise a step 31 of calculating data indicative of the trajectory of the projectile based on the electromagnetic waves sensed by the radar.

Data indicative of the trajectory of the projectile can include for instance the range of the projectile. These data can also include elevation and/or azimuth angles.

Step 31 can be performed by a processing unit of the radar or by an external processing unit in communication with the radar, such as the processing unit 15 of the system.

Steps 30 and 31 can be performed during at least a part of the trajectory of the projectile, while the projectile is flying in the air and has not yet reached its impact point.

According to some embodiments, a plurality of projectiles is detected and/or tracked by the radars. In order to differentiate the projectiles, the electromagnetic waves sent by the transmitting device of each projectile can, for example, be emitted on a different frequency, or can be modulated with different modulation signals (frequency modulation, amplitude modulation, etc.).

The method can comprise a step 32 of determining an impact point of the projectile based on the calculated data.

This step can be performed by a processing unit, such as the processing unit 15 of FIG. 1, which receives data indicative of the trajectory of the projectile as calculated.

The processing unit can store additional data on the projectile such as its mass, which can be known in advance, or estimated, depending on the projectile.

In order to predict the impact point of the projectile, the processing unit can carry out a method based on an "impact point algorithm". This method can comprise the step of predicting, using the last detection(s) or last track(s) of the projectile, the most probable point or area that will hit the projectile on the ground. This method can use DTM, or not. The method can use data on the projectile which are known in advance (e.g. mass, moment, etc.) and/or ballistic data (e.g. drag, muzzle velocity, etc.).

The processing unit can thus output an impact point which can be characterized by geographic coordinates defining the limits of the predicted impact point. According to some embodiments, the processing unit can also output a predicted impact point associated to an estimated error (such as a CEP, which stand for circular error probability).

Other characterizations of the impact point can be computed, depending on the needs of the user.

According to some embodiments, prediction of the impact point of the projectile is made while the projectile is flying in the air. Thus, a real time prediction of the impact point can be performed.

It is to be noted that steps 30 to 32 can be performed for different projectiles which were launched in the air simultaneously or successively. These steps can be performed for each projectile.

The method can also comprise a step of displaying, on a display unit, the assessed impact point of the projectile.

If several projectiles are detected and/or tracked, an impact point or impact point can be drawn for each projectile.

According to some embodiments, determination of the data indicative of the trajectory of the projectile is based only on the electromagnetic signal sent by the transmitting device and sensed by the radar, without using additional sensors (such as GPS sensors, etc.).

In some embodiments of the proposed invention, it is sufficient to embed a transmitting device on the projectile, which transmits electromagnetic waves to the (passive) radars. It is not necessary to embed a position sensor on the projectile (such as a GNSS sensor). Signals emitted from the projectile can thus be limited to electromagnetic waves sent by the transmitting device mounted on the projectile. In addition, it is not necessary to detect and/or track the projectile with active sensors such as radars or LIDAR or optical means that send signals towards the projectile.

According to some embodiments, the impact point of the projectile is based only on data indicative of the trajectory of the projectile that were calculated based on electromagnetic waves received by the radars from the transmitting device.

According to some embodiments, the processing unit can receive additional data indicative of the trajectory of the projectile that can be computed from other sensors mounted on the projectile (such as a position sensor) or that were computed using other systems for detecting and/or tracking a projectile. In this case, the processing unit can for example perform an aggregation of the different data, or compare the predicted impact point obtained using each data in order to improve performance of the prediction.

Figure 4:
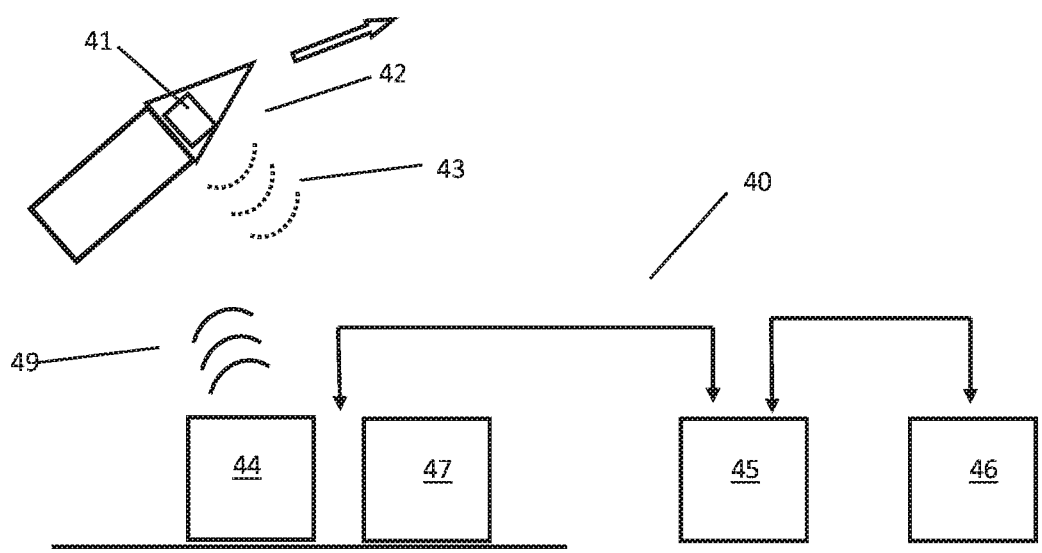
FIG. 4 illustrates another embodiment of a system for detecting and/or tracking of a projectile, which can also be used to determine an impact point of the projectile.

Attention is now drawn to FIG. 4, which describes another possible embodiment of a system 40 for detecting and/or tracking a projectile. This system 40 can also be used for determining an impact point of the projectile.

The system 40 can comprise at least one (active) radar 44. According to some embodiments, the system can comprise a plurality of radars 44.

In particular, the radar 44 can send an electromagnetic signal 49 towards space, which is sensed by a device 41 (see FIG. 5 which depicts an embodiment of the device 41) mounted on the projectile 42.

According to some embodiments, the electromagnetic signal 49 is located in the radio-frequency spectrum ("RF"). The radio-frequency spectrum can correspond to the part of the electromagnetic spectrum from 30 MHz to 100 GHz. According to some embodiments, the electromagnetic signal 49 is located in the UHF, VHF, L, S, C, X, KU, K, or KA band of the RF spectrum. This list is however not limitative.

The projectile 42 can be similar to the projectile 12 described previously.

Figure 5:
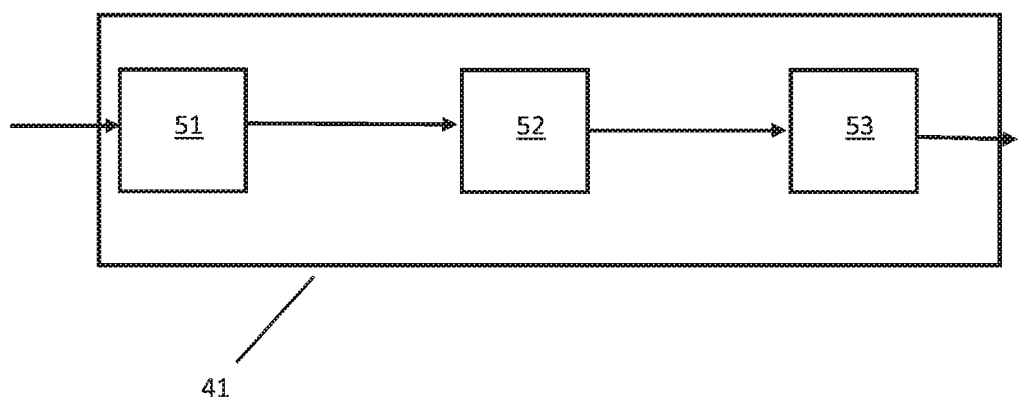
FIG. 5 illustrates an embodiment of a device which can be mounted on the projectile, for detecting and/or tracking the projectile and determining its impact point.

As explained further with respect to FIG. 5, the device 41 can be configured to sense the electromagnetic signal sent by the radar 44, to amplify this signal, and to return (send back) an amplified electromagnetic signal 43.

The returned electromagnetic signal 43 can be sensed by at least a radar located e.g. on the ground (or a plurality of radars), which can be the radar 44 (which is thus used both for emission and reception) or another radar(s) 47 or antenna(s), such as a passive radar or a passive antenna.

The system 40 can further comprise a processing unit 45. The processing unit 45 can be configured to communicate with the radar(s) 44/47, in order to detect and/or track the projectile 42 and, if necessary, to determine an impact point of the projectile 42 based on the data measured by the radar(s) 44/47. According to some embodiments, the processing unit further receives data calculated by the radar(s) 44/47.

According to some embodiments, the system 40 can further comprise a display unit 46, similar to the display unit 16 of FIG. 1.

According to some embodiments, a plurality of radars or antennas 47 is used to improve the accuracy of the measurement of the return electromagnetic signal 43.

Attention is now drawn to FIG. 5, which describes a possible embodiment of a device 41 which can be mounted on the projectile.

The device 41 can comprise at least a receiving antenna 51, an amplifier 52 and at least an emitting antenna 53. A source of energy such as a battery (not represented) can also be embedded in the device and/or in the projectile.

According to some embodiments, the device 41 comprises a plurality of receiving antennas 51 and/or emitting antennas 53 in order to cover a larger angular portion of the space.

According to some embodiments, one to six receiving antennas 51 are present on the projectile, in particular on its circumference. These numbers are however not limitative.

Similarly, according to some embodiments, a plurality of emitting antennas 53 is used, which can be located around the circumference of the projectile (inside or outside the projectile).

According to some embodiments, the device 41 is located at the level of the fuse in the case of a military projectile.

According to some embodiments, the radar 44 sends an electromagnetic signal in a given bandwidth, and the receiving antenna 51 is configured to sense electromagnetic signals in this given bandwidth, for coupling the receiving antenna to the radar. In this case, the bandwidth of the radar 44 (in emission) and the bandwidth of the receiving antenna 51 (in reception) at least intersect, in order to allow this coupling.

This coupling can be useful when a plurality of projectiles is detected and/or tracked, for example when each projectile is coupled to a different radar (this applies also to a group of projectiles, wherein each group of projectiles is coupled to a radar or to a group of radars).

According to some embodiments, the receiving antenna 51 is configured to sense an electromagnetic signal in the radio-frequency (RF) spectrum.

As depicted in FIG. 5, the input of the amplifier 52 can comprise the electromagnetic signal sensed by the receiving antenna 51. After amplification of the sensed signal, the amplifier 52 can transmit the amplified signal to at least an emitting antenna 53. As a non-limitative example, the amplifier 52 can amplify with a gain of 30 dB. Other values can be used.

The emitting antenna 53 returns an amplified electromagnetic signal based on the signal amplified by the amplifier 52.

The amplifier can be located on a PCB. Depending on the embodiments, the receiving antenna and the emitting antenna can be also located on the PCB.

According to some embodiments, the device 41 is configured to maintain the electromagnetic signal in the radio-frequency range from its reception by the receiving antenna 51 to its return as an amplified electromagnetic signal by the emitting antenna 53 (that is to say at the output of the device 41).

It is thus not needed to convert the signal such as in the intermediate frequency range.

According to some embodiments, the return electromagnetic signal, at the output of the device 41, differs from the electromagnetic signal received by the receiving antenna 51 only by its amplitude (or substantially only by its amplitude).

In other words, a function representing the return electromagnetic signal (at the output of the device 41) with respect to time can differ from the function representing the electromagnetic signal with respect to time as sensed by the device (substantially) only by a difference in the amplitude.

This embodiment also covers the case in which small unwanted differences are introduced in other parameters of the signal such as in the frequency, the phase, etc., due to noise in the transmission and/or in the amplification in the device. In this case, the return electromagnetic signal also differs substantially only by a difference in the amplitude from the electromagnetic signal sensed by the device.

In addition, as explained later in the specification, a change in polarization can be made in some embodiments, but this does not change the function representing the amplitude of the electromagnetic signal with respect to time.

It is to be noted that at the receiving side on the ground, that is to say when the radar 44 or 47 senses the return electromagnetic signal, deformations can be present due to the smear effect (which can be caused by rotation of the projectile around its axis). In addition, the frequency can be changed due to the Doppler effect.

According to some embodiments, there is no need to manipulate the sensed electromagnetic signal received by the device (such as by delaying it, or converting it into a different frequency). According to some embodiments, the signal is thus not manipulated in the device, except for its amplification.

This can occur for example if the device comprises only an amplifier between the receiving antenna(s) and the emitting antenna(s)—that is to say that the amplifier is the only module of the device which can change the shape of the electromagnetic signal with respect to time.

Thus, in this embodiment, the expression of the electromagnetic signal with respect to time is not changed by the device (that is to say between the input and the output of the device), except for its amplification.

According to some embodiments, the projectile 12 on which the device is mounted is configured to rotate around its main axis, at least during part of its flight. In particular, according to some embodiments, the projectile 12 is a spin-stabilized projectile, which can rotate at a frequency of 200 rotations per second or more (this value being not limitative).

According to some embodiments, it may be necessary to isolate the receiving antenna 51 from the emitting antenna 53.

Such isolation can be performed to avoid e.g. the electromagnetic waves emitted by the emitting antenna 51 of the device being received by the receiving antenna 53 of the device, which would cause positive feedback.

According to some embodiments, the receiving antenna 51 can output an electromagnetic signal with a first polarization, and the emitting antenna 53 can output an electromagnetic signal with a second polarization, wherein the first polarization is different from the second polarization. Examples of different polarizations include horizontal, vertical and circular polarizations.

This can be obtained e.g. by orienting the sensing elements of the receiving antennas in a different manner than the emitting elements of the emitting antennas.

Figure 6:
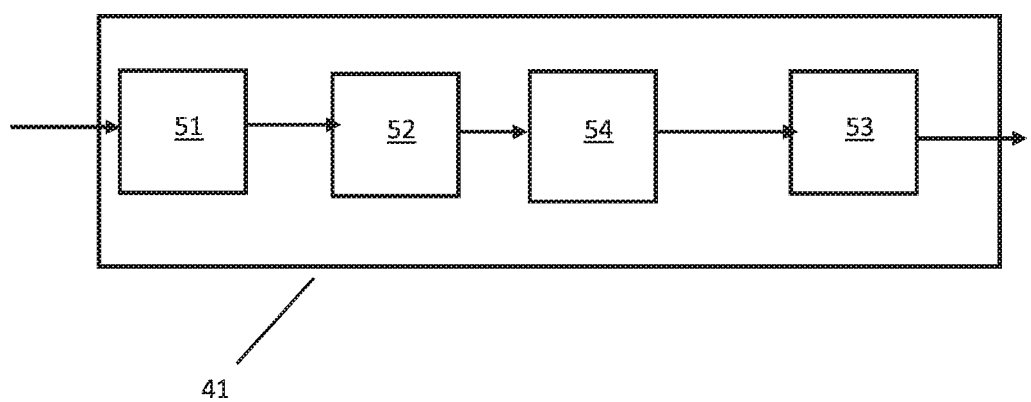
FIG. 6 illustrates a possible variant of the device of FIG. 5.

FIG. 6 illustrates an embodiment in which the electromagnetic signal sensed by the device 41 is amplified and modulated. The device 41 of FIG. 6 differs from the device of FIG. 5 in that it further comprises a unit 54 which is configured to modulate the electromagnetic signal (this unit is generally called a "modulator"). The unit 54 can be disposed before or after the amplifier 52.

Such modulation can be a modulation in frequency, or a modulation in phase, or a modulation in amplitude.

According to some embodiments, a plurality of projectiles may be detected and/or tracked by the system 40.

The modulation depicted in FIG. 6 can be used to differentiate the projectiles. In this case, electromagnetic signals with different modulation signals can be sent back by the devices of the different projectiles, in order to differentiate between the projectiles.

Other techniques can be used to differentiate the projectiles.

According to some embodiments, the time at which each projectile is launched is known since the system 40 can communicate with the launcher of the projectiles. Thus, it is possible to differentiate between the projectiles based on the launching time.

Figure 7:
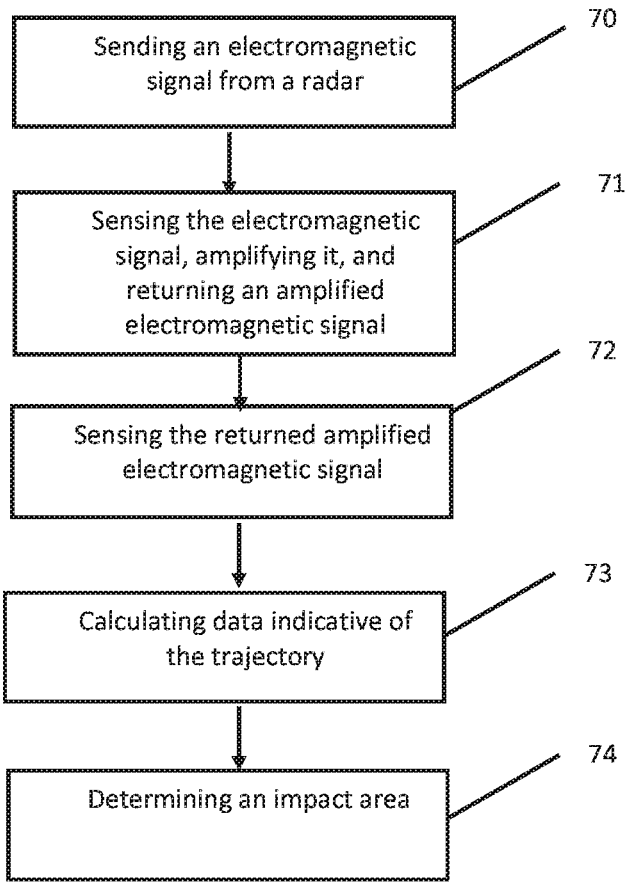
FIG. 7 illustrates an embodiment of a method of determining an impact point of a projectile, using e.g. the device of FIG. 5 or FIG. 6.

FIG. 7 describes an embodiment of a method of detecting and/or tracking a projectile and determining an impact point of a projectile, which can use the system 40 as previously described.

The method can comprise a step 70 of sending an electromagnetic signal, typically a RF signal, from a radar 44, which can be located e.g. on the ground.

In step 71, the electromagnetic signal is received by the receiving antenna 51, or by the plurality of receiving antennas 51 of the device 41 mounted on the projectile flying in the air.

The electromagnetic signal is then amplified by the amplifier 52 and transmitted to the emitting antenna(s) 53, which returns an amplified electromagnetic signal. As mentioned above, the device can be configured to keep the electromagnetic signal in the RF range. In some cases, modulation is performed on the electromagnetic signal, as explained with reference to FIG. 6.

In step 72, one or more radars 44/47 can sense the return amplified electromagnetic signal. If the projectile is in rotation, the return electromagnetic signal sensed by the radar 44/47 might be smeared. The use of a plurality of emitting/receiving antennas in the device 41 can help to reduce the effect of the smear of the signal sensed by the radar 44/47. In addition, the use of an amplifier in the device is useful to compensate the impact of the rotation of the projectile, since this rotation can reduce the power of the return electromagnetic signal as sensed by the radar 44/47.

The method can further comprise a step 73 of calculating data indicative of the trajectory of the projectile based on the electromagnetic signal sensed by the radar 44/47.

Data indicative of the trajectory of the projectile can include for instance a range of the projectile. These data can also include an angle between an axis of the radar and an axis of the projectile, such as elevation and/or azimuth angle.

The calculation of the data indicative of the trajectory of the projectile can be performed by comparing the electromagnetic signal as sent by the radar 44 towards the projectile with the electromagnetic signal as sensed in return by the radar 44/47.

The time difference can provide indication of the range of the projectile, which thus can be used to calculate inertial data such as velocity.

Step 73 can be performed by a processing unit of the radar or by an external processing unit in communication with the radar, such as the processing unit 45 of the system 40.

The method can comprise a step 74 of determining an impact point of the projectile based on the calculated data.

This step can be performed by a processing unit, such as the processing unit 45.

This step is similar to step 32 described with reference to FIG. 3.

If necessary, the method can also comprise a step of displaying, on a display unit the assessed impact point of the projectile(s).

According to some embodiments, determination of data indicative of the trajectory of the projectile is based on the electromagnetic signal sent back by the device 41 and sensed by the radar (s), without using additional sensors (such as GPS sensors, etc.).

In the proposed embodiment, it is thus not necessary to embed a position sensor on the projectile (such as a GNSS sensor) or to use additional track sensors. Signals emitted from the projectile can thus be limited to electromagnetic waves sent back by the device mounted on the projectile.

According to some embodiments, determination of the impact point of the projectile is based only on data indicative of the trajectory of the projectile that were calculated from the return electromagnetic signal received by the radar(s) 44/47.

According to some embodiments, the processing unit can receive additional data indicative of the trajectory of the projectile that can be computed from other sensors mounted on the projectile (such as a position sensor) or that were computed using other systems for detecting and/or tracking a projectile. In this case, the processing unit can for example perform an aggregation of the different data, or compare the predicted impact point obtained using each data in order to improve performance of the prediction.

Figure 8:
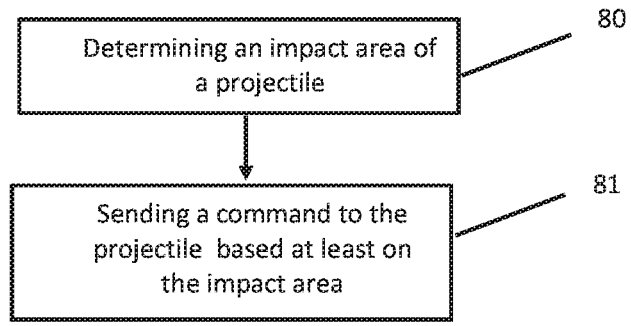
FIG. 8 illustrates an embodiment of a method of sending a command to the projectile, based on the determined impact point.

Attention is now drawn to FIG. 8 which describes a method of detecting and/or tracking a projectile. In some embodiments, the projectile can carry an explosive device, such as a bomb.

Once the impact point has been determined (step 80, as already explained with reference to FIG. 7), the method can comprise sending (step 81) a command to the projectile based on the determined impact point.

According to some embodiments, the command can be sent by the radar 44 itself.

In other embodiments, the determined impact point is displayed to a user, which may determine to send, through an interface of the system 40, a command to the projectile.

A possible command can be a command for neutralizing the explosive device, or for instructing the projectile to change its trajectory (e.g. by sending navigation commands to a processing unit of the projectile), etc. Other commands can be sent to avoid that the projectile reaches the determined impact point.

A possible embodiment of a method of sending a command to the projectile will now be described. It is to be noted that other embodiments can be used.

The radar 44 can send a modulated code ("A word") in the electromagnetic signal that it emits towards the device 41.

The projectile 41 which carries the explosive device can comprise a demodulator and a correlator (not represented). The demodulator and the correlator can be operable on a processing unit. The correlator can be configured to perform correlation methods such as "cross-correlation" methods.

The modulated code is received by the projectile 41 (such as through the receiving antenna of the device, or through another sensor), is continuously demodulated by the demodulator, and is correlated to a pre-stored "correct" word (the correct word can be viewed as a password indicating that the a command should be executed, and can be stored in a memory in the projectile).

When the correlator determines that the modulated code as received and the correct word are correlated, then a command is executed.

For example, a command can be sent to the explosive device (such as by a processing unit) which makes the explosive device detonate in the air, instead of detonating near the ground. This command can be sent by a processing unit of the device, or by another processing unit embedded on the projectile.

Although system 9 and system 40 have been described separately, it is to be understood that according to some embodiments, they can be used concurrently, or alternatively, in time.

For example, a projectile can embed both a transmitting device 11 and a device 41 as described. Alternatively, part of the projectiles can embed a transmitting device 11 and part of the projectiles can embed a device 41.

The radars 14, 47 can be used both for detecting the electromagnetic signals sent by the transmitting device and the returned electromagnetic signal sent by the device.

According to some embodiments, a processing unit calculates data indicative of the trajectory of the projectile based on the electromagnetic signals sent by the transmitting device 11 and on the electromagnetic signals sent back by the device 41, and can aggregate these data to improve the detection and/or the track of the projectile.

Other combinations of the systems 9, 40 can be performed depending on the embodiments.

Figure 9A:
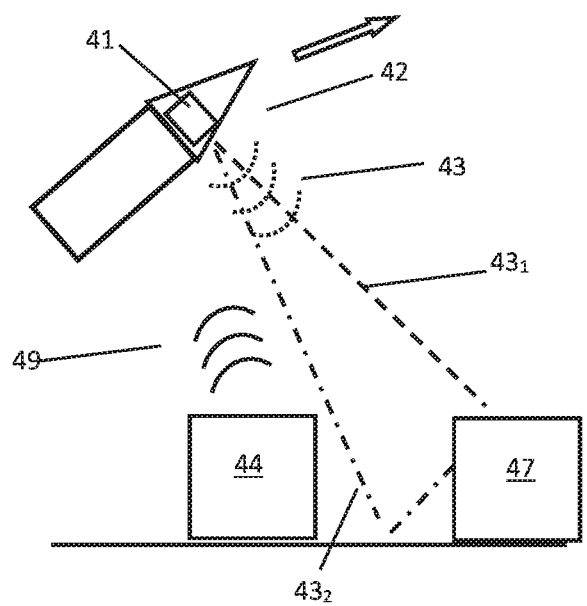
FIG. 9A illustrates a multi-path phenomena, in the case of the system of FIG. 4.
Figure 9B:
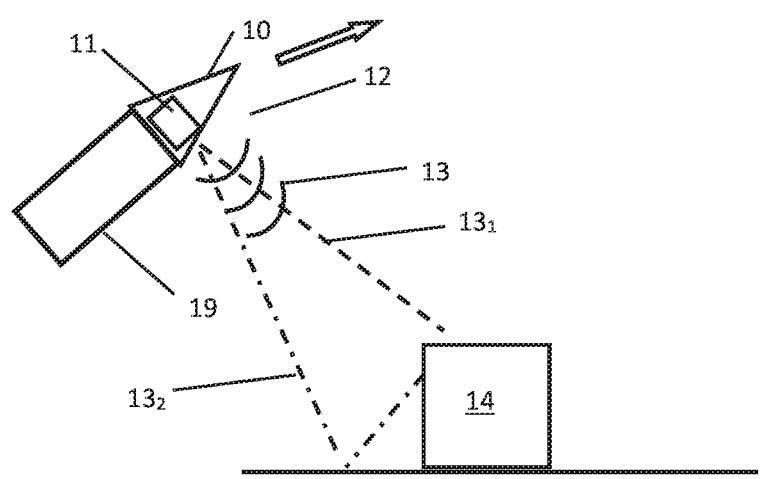
FIG. 9B illustrates a multi-path phenomena, in the case of the system of FIG. 1A.

Attention is now drawn to FIG. 9A and FIG. 9B.

As shown in FIG. 9A, the device 41 returns amplified electromagnetic signals 43 (as described in the various embodiments above) which can comprise:
  first amplified electromagnetic signals $43_1$ returned by the device 41 directly towards the radar 47, that is to say without being reflected by an obstacle before being sensed by the radar, and
  second amplified electromagnetic signals $43_2$ returned by the device 41 and sensed by the radar 47 after their reflection on one or more obstacles (in this example the ground).

The same phenomena is illustrated in FIG. 9B.

The transmitting device 11 sends electromagnetic signals 13 (as described in the various embodiments above) which can comprise:
  first electromagnetic signals (represented as $13_1$) are sent directly from the transmitting device 11 to the radar 14, that is to say without being reflected by an obstacle before being sensed by the radar 14, and
  second electromagnetic signals (represented as $13_2$) are reflected by one or more obstacles (in this example the ground) before being sensed by the radar 14.

The phenomena depicted above is called "multi-path". The electromagnetic signals that are reflected by one or more obstacles before being sensed by the radar can introduce perturbations in the calculation of data indicative of the trajectory of the projectile, and thus need to be identified and, if necessary, at least partly removed (multi-path reduction or cancellation).

Figure 10A:
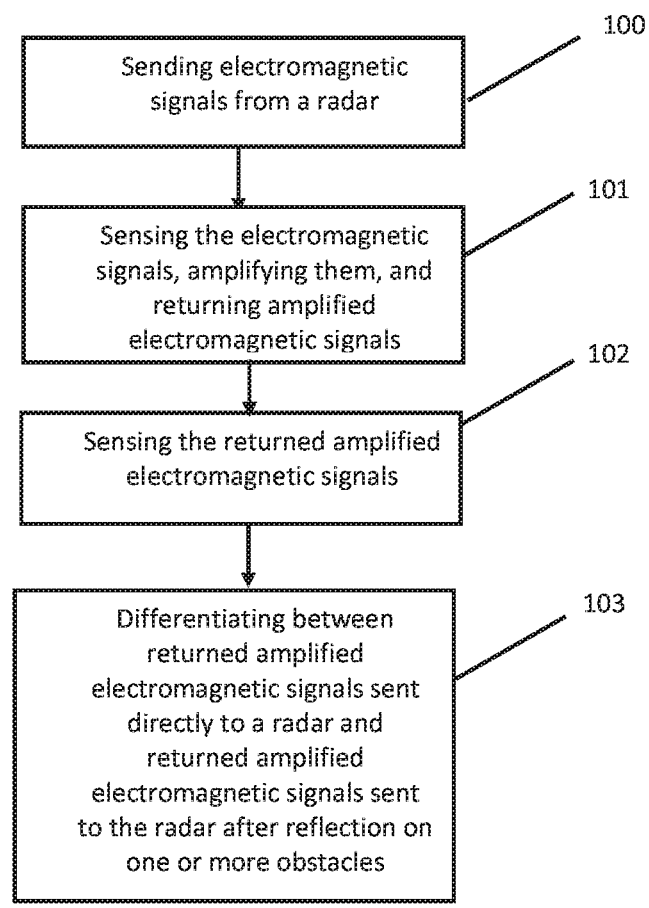
FIG. 10A describes a method of handling multi-path phenomena, using a system such as the system of FIG. 4.

Attention is now drawn to FIG. 10A.

As already explained with reference to steps 70 to 72 of FIG. 7, electromagnetic signals can be sent from a radar 44 towards space (see step 100). The device 41 can sense these signals and return amplified electromagnetic signals (see step 101).

After the radar 47 has sensed amplified electromagnetic signals returned by the device 41 (see step 102), a method can comprise, by a processing unit (such as a processing unit of the radar 47 and/or an external processing unit in communication with the radar 47), differentiate (step 103 in FIG. 10A) between:
  amplified electromagnetic signals returned (directly) by the device 41 towards the radar 47, and
  amplified electromagnetic signals returned by the device 41 and sensed by the radar 47 after their reflection on one or more obstacles.

This differentiation is not necessary a complete differentiation and according to some embodiments it can be only partial. If necessary, partial or complete removal of the multi path signals can be performed.

Algorithms such as "super-resolution algorithm" (this is however not limitative) can be used for performing this differentiation.

Data representative of the trajectory of the projectile can then be calculated based on the amplified electromagnetic signals returned directly by the device towards the radar. The impact point of the projectile can also be assessed (as explained with reference to FIG. 7, see steps 73 and 74).

It has been described with reference to FIG. 5 that the device 41 can be configured to maintain the electromagnetic signal in the radio-frequency range from its reception by a receiving antenna to its return as an amplified electromagnetic signal by an emitting antenna at the output of the device. The method of FIG. 10A can be applied to such a device, but also to a device which does not necessarily maintain the electromagnetic signal in the radio-frequency range from the input to the output of the device (and which does not necessarily receive electromagnetic signals in the radio-frequency range but possibly also in other ranges).

In particular, according to some embodiments, the method can be applied to a device comprising at least one receiving antenna, at least one amplifier, and at least one emitting antenna, wherein the receiving antenna receives electromagnetic signals sent by the radar and amplifies these electromagnetic signals. This amplification can involve electrical amplification and/or a mechanical amplification (such as an amplification involving a material such as, but not limited to, a metal). According to some embodiments, manipulations of the frequency and/or of other parameters of the electromagnetic signals can be performed by the device. The device can then send back amplified electromagnetic signals using the emitting antenna.

Since the electromagnetic signals returned by the device 41 are amplified, it is possible to improve the detection of the projectile, even for radars which are configured to scan space for detecting the projectile with only a low or medium power, while being able to handle the multi-path phenomena.

According to some embodiments, the electromagnetic signals sent by the radar 44 towards space can have one or more of the following properties (meaning only one of these properties, or more than one, according to any combination). According to some embodiments, these parameters can be used only during specific time periods, such as when it has been detected that the projectile is approaching its impact area.

According to some embodiments, specific pulse repetition frequency (PRF) can be used. In particular, a PRF which has a value between 0.5 kHz and 100 kHz (including any sub-range or value in this range) can be used.

According to some embodiments, a duty cycle (which represents also the pulse width) comprised between 1% and 50% (including any sub-range or value in this range) of the pulse repetition interval (PRI) can be used.

According to some embodiments, the electromagnetic signals sent by radar 44 can have a duration between 1 ms and 100 ms (including any sub-range or value in this range). Generally, each signal comprises a plurality of pulses (as mentioned below the frequency is generally increased every N pulses), and this duration corresponds to a sequence of these pulses (this sequence can be repeated over time).

According to some embodiments, the electromagnetic signals sent by the radar 44 can have a frequency which is increased during time (e.g. every N pulses the frequency is increased, and/or stepped frequency signals and/or LFM method, these examples being not limitative).

According to some embodiments, the bandwidth of the electromagnetic signals can be e.g. between 1 kHz and 10 GHz (including any sub-range or value in this range). In particular, according to some embodiments, a bandwidth located in the range between 1 kHz and 10 GHz can be obtained with an electromagnetic signal (comprising a plurality of pulses for which an increase of the frequency is performed) having a duration less than 5 ms, such as around 1 ms. This is however not limitative.

Since the duty cycle can be shortened and/or the PRF can be raised, the number of pulses can be increased, thereby allowing increasing the bandwidth, without harming the energy of the signals (thereby allowing handling the multi-path phenomena).

In addition, according to some embodiments, a greater bandwidth is obtained without increasing the duration of each of the signals, or even with a reduction of this duration.

The use of one or more of the parameters mentioned above can improve the accuracy of the detection of the projectile, and in turn, the calculation of data representative of the trajectory of the projectile and the calculation of the impact point (while being able to handle the problem of multi-path).

According to some embodiments, the projectile can be detected and/or data representative of the trajectory of the projectile can be calculated even when the projectile has a low elevation range (the multi-path phenomena has generally a greater impact at low elevation range), that is to say e.g. between 0 and 5 degrees, or 0 and 3 degrees, or 0 and 1.5 degrees (or any sub-range and value located in these ranges).

This implies that the projectile can be detected closer to the impact area, which thus improves the determination of said impact area, even when then multi-path phenomena is encountered.

According to some embodiments, these parameters can be applied even to radars (which are used for scanning space, such as radar 44) with low to medium power, that is to say between e.g. 100 Watts and 4 kWatts (or any value or sub-range in this range), for detecting and/or tracking a projectile in a more accurate manner while handling the multi-path phenomena. This is however not limitative.

Figure 10B:
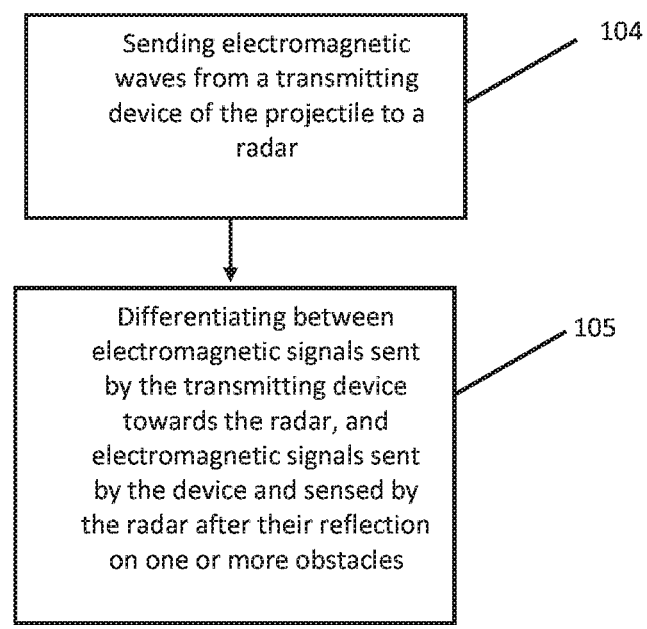
FIG. 10B describes a method of handling multi-path phenomena, using a system such as the system of FIG. 1A.

Attention is now drawn to FIG. 10B.

The transmitting device 11 can send (see step 104 in FIG. 10B) electromagnetic waves from the projectile to a radar (such as radar 14), as already explained with reference to step 30 in FIG. 3.

A method can comprise (step 105 in FIG. 10B), by a processing unit (such as a processing unit of the radar 14 and/or an external processing unit in communication with the radar 14), differentiating between:
  electromagnetic signals sent (directly) by the transmitting device 11 to the radar, and
  electromagnetic signals sent by the transmitting device 11 and sensed by the radar after their reflection on one or more obstacles.

This differentiation is not necessary a complete differentiation and can be only partial. If necessary, partial or complete removal of the multi-path signals can be performed.

Algorithms such as "super-resolution algorithm" (this is however not limitative) can be used for performing this differentiation.

Data representative of the trajectory of the projectile can then be calculated based on the electromagnetic signals sent directly by the device towards the radar. The impact area of the projectile can also be assessed (as explained with reference to FIG. 3, see steps 31 and 32).

As explained with reference to FIG. 10A, specific parameters can be used for the electromagnetic signals. In the embodiment of FIG. 10B, these specific parameters can be used for the electromagnetic signals sent by the transmitting device 11 itself.

According to some embodiments, the electromagnetic signals sent by the transmitting device 11 towards space can have one or more of the following properties (meaning only one of these properties, or more than one, according to any combination).

According to some embodiments, specific pulse repetition frequency (PRF) can be used. In particular, a PRF which has a value between 0.5 kHz and 100 kHz (including any sub-range or value in this range) can be used.

According to some embodiments, a duty cycle (which represents also the pulse width) comprised between 1% and 50% (including any sub-range or value in this range) of the pulse repetition interval (PRI) can be used.

According to some embodiments, the electromagnetic signals sent by the transmitting device 11 can have a duration between 1 ms and 100 ms (including any sub-range or value in this range). Generally, each signal comprises a plurality of pulses (as mentioned below the frequency is generally increased every N pulses), and this duration corresponds to a sequence of these pulses (this sequence can be repeated over time).

According to some embodiments, the electromagnetic signals sent by the transmitting device 11 can have a frequency which is increased during time (e.g. increase every N pulses, and/or stepped frequency signals and/or LFM method).

According to some embodiments, the bandwidth of the electromagnetic signals can be e.g. between 1 kHz and 10 GHz (including any sub-range or value in this range). In particular, according to some embodiments, a bandwidth located in the range between 1 kHz and 10 GHz can be obtained with an electromagnetic signal (comprising a plurality of pulses for which an increase of the frequency is performed) having a duration less than 5 ms, such as around 1 ms. This is however not limitative.

The use of one or more of these parameters can provide similar advantages to what was described with reference to FIG. 10A.

The invention contemplates a computer program being readable by a computer for executing at least part of one or more methods of the invention. The invention further contemplates a machine-readable memory tangibly embodying a program of instructions executable by the machine for executing at least part of one or more methods of the invention.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A device configured to perform at least one of detecting and tracking a projectile, wherein the device is mounted on the projectile, wherein the device comprises:
   at least one receiving antenna mounted on the projectile, configured to receive at least an electromagnetic signal emitted by at least one active radar in the radio-frequency range,
   at least one amplifier mounted on the projectile configured to amplify the electromagnetic signal received by the receiving antenna, and
   at least one emitting antenna mounted on the projectile, wherein said emitting antenna is configured to return, at an output of the device, an amplified electromagnetic signal towards a radar or an antenna,
   wherein the amplified electromagnetic signal is usable for calculating data indicative of a trajectory of the projectile,
   wherein the amplified electromagnetic signal corresponds to the electromagnetic signal received by the receiving antenna mounted on the projectile or a signal informative thereof, after its amplification by said amplifier,
   wherein the device mounted on the projectile is configured to process the electromagnetic signal without down-converting a frequency of the electromagnetic signal by a down-converter,
   wherein the device is configured to maintain said electromagnetic signal in the radio-frequency range from its reception by the receiving antenna to its return as an amplified electromagnetic signal by said emitting antenna at the output of the device.

2. The device of claim 1, wherein physical attributes of the amplified electromagnetic signal at the output of the device are the same as physical attributes of the electromagnetic signal received by the device, wherein the physical attributes comprise at least one of modulation, phase and frequency.

3. The device of claim 1, wherein the receiving antenna is configured to receive an electromagnetic signal with a first polarization, and the emitting antenna is configured to output an electromagnetic signal with a second polarization, wherein the first polarization is different from the second polarization.

4. The device of claim 1, further configured to modulate the electromagnetic signal before or after its amplification by the amplifier.

5. A projectile comprising a device according to claim 1, wherein the projectile is an unguided projectile.

6. A system configured to perform at least one of detecting and tracking a projectile, comprising:
   at least one active radar configured to send an electromagnetic signal to a device mounted on the projectile, wherein the device is configured to:
   sense and amplify said electromagnetic signal in order to return an amplified electromagnetic signal at an output of the device, and
   maintain said electromagnetic signal in the radio-frequency range from its sensing by the device to its return as an amplified electromagnetic signal at the output of the device, wherein the device mounted on the projectile is configured to process the electromagnetic signal without down-converting a frequency of the electromagnetic signal by a down-converter, and at least one processing unit, configured to calculate data indicative of the trajectory of the projectile, based at least on the sensing of said amplified electromagnetic signal.

7. The system of claim 6, wherein a profile of a function representing the amplified electromagnetic signal with respect to time at the output of the device differs from a profile of a function representing the electromagnetic signal sensed by the device with respect to time only by a difference in amplitude.

8. The system of claim 6, further comprising one or more passive and/or active radars and/or antennas configured to sense the amplified electromagnetic signal.

9. The system of claim 6, further configured to determine an impact point of the projectile based on the calculated data.

10. The system of claim 9, wherein the system is configured to send a command to the projectile based on the determined impact point.

11. The system of claim 10, wherein the radar is configured to send the command.

12. The system of claim 6, wherein the device comprises at least a receiving antenna which receives an electromagnetic signal with a first polarization, and at least an emitting antenna which outputs an electromagnetic signal with a second polarization, wherein the first polarization is different from the second polarization.

13. The system of claim 6, wherein the system is configured to detect and/or track a plurality of projectiles and to differentiate between the projectiles of the plurality of projectiles.

14. The system of claim 6, wherein the data indicative of the trajectory of the projectile are calculated based at least on the sensing of the amplified electromagnetic signal, without using information of additional position sensors.

15. The system of claim 6, wherein:
the radar is configured to send electromagnetic signals which have at least one the following parameters:
a pulse repetition frequency between 0.5 kHz and 100 kHz, and
a duty cycle which is between 1% and 50% of a pulse repetition interval,
wherein the processing unit is configured to perform a differentiation between:
amplified electromagnetic signals returned by the device towards the radar, and
amplified electromagnetic signals returned by the device and sensed by the radar after their reflection on one or more obstacles, for calculating data indicative of the trajectory of the projectile.

16. The device of claim 1, wherein the at least one receiving antenna (53), the at least one amplifier (52) and the at least one emitting antenna (51) are located on a PCB.

17. The system of claim 10, configured to send a command to the projectile based on the determined impact point, wherein the command comprises a command for neutralizing an explosive device of the projectile.

18. The system of claim 6, comprising one or more passive radars.

19. The device of claim 1, wherein the device is mounted in a fuse of a projectile, or on a fuse of the projectile.

20. The system of claim 6, comprising at least two radars configured to sense said amplified electromagnetic signal, wherein the at least two radars comprise the active radar.

21. The system of claim 6, comprising at least two radars configured to sense said amplified electromagnetic signal, wherein the at least two radars do not comprise the active radar.

* * * * *